(12) United States Patent
Dams

(10) Patent No.: US 7,566,480 B2
(45) Date of Patent: Jul. 28, 2009

(54) FLUOROCHEMICAL COMPOSITION FOR TREATING POROUS STONE

(75) Inventor: Rudolf J. Dams, Antwerp (BE)

(73) Assignee: 3M Innovative Properties Company, St. Paul, MN (US)

( * ) Notice: Subject to any disclaimer, the term of this patent is extended or adjusted under 35 U.S.C. 154(b) by 621 days.

(21) Appl. No.: 11/192,940

(22) Filed: Jul. 29, 2005

(65) Prior Publication Data

US 2006/0045979 A1 Mar. 2, 2006

(30) Foreign Application Priority Data

Sep. 2, 2004 (EP) .................. 04104235

(51) Int. Cl.
*B05D 3/02* (2006.01)
(52) U.S. Cl. ................... 427/393.6
(58) Field of Classification Search ......... 427/393.6
See application file for complete search history.

(56) References Cited

U.S. PATENT DOCUMENTS

| | | | |
|---|---|---|---|
| 2,803,615 A | | 8/1957 | Ahlbrecht et al. |
| 3,787,351 A | | 1/1974 | Olson |
| 4,125,673 A | * | 11/1978 | Roth et al. ............... 428/447 |
| 4,366,300 A | | 12/1982 | Delescluse |
| 4,478,975 A | | 10/1984 | Dessaint et al. |
| 4,557,837 A | | 12/1985 | Clark, III et al. |
| 4,764,431 A | | 8/1988 | Piacenti et al. |
| 5,276,175 A | | 1/1994 | Dams et al. |
| 5,453,540 A | | 9/1995 | Dams et al. |
| 5,527,931 A | | 6/1996 | Rich et al. |
| 5,798,415 A | | 8/1998 | Corpart et al. |
| 5,919,527 A | | 7/1999 | Fitzgerald et al. |
| 5,989,698 A | | 11/1999 | Mrozinski et al. |
| 5,990,212 A | | 11/1999 | Hager et al. |
| 6,037,429 A | | 3/2000 | Linert et al. |
| 6,120,892 A | | 9/2000 | Fitzgerald et al. |
| 6,197,382 B1 | | 3/2001 | Ornstein et al. |
| 6,271,289 B1 | | 8/2001 | Longoria et al. |
| 6,303,190 B1 | | 10/2001 | Linert et al. |
| 6,383,569 B2 | | 5/2002 | Ornstein et al. |
| 6,646,088 B2 | | 11/2003 | Fan et al. |
| 6,656,258 B2 | * | 12/2003 | Elsbernd et al. .......... 106/287.1 |
| 6,664,354 B2 | | 12/2003 | Savu et al. |
| 6,689,854 B2 | | 2/2004 | Fan et al. |
| 6,903,173 B2 | | 6/2005 | Cernohous et al. |
| 6,977,307 B2 | * | 12/2005 | Dams ..................... 556/485 |
| 7,041,727 B2 | | 5/2006 | Kubicek et al. |
| 2002/0037370 A1 | | 3/2002 | Bartkowiak et al. |
| 2005/0027063 A1 | | 2/2005 | Audenaert et al. |
| 2005/0106326 A1 | | 5/2005 | Audenaert et al. |
| 2005/0142563 A1 | | 6/2005 | Haddad et al. |

FOREIGN PATENT DOCUMENTS

| | | |
|---|---|---|
| EP | 0 624 710 A1 | 11/1994 |
| EP | 0 714 921 | 6/1996 |
| EP | 0 795 592 | 9/1997 |
| EP | 1 225 187 | 7/2002 |
| EP | 1 225 188 | 7/2002 |
| EP | 1 369 453 | 12/2003 |
| WO | WO 01/36526 | 5/2001 |
| WO | WO 02/04383 | 1/2002 |
| WO | WO 02/14443 | 2/2002 |

* cited by examiner

*Primary Examiner*—Erma Cameron
(74) *Attorney, Agent, or Firm*—Robert H. Jordan; Brian E. Szymanski; Kathleen B. Gross

(57) ABSTRACT

The present invention relates to a method of treating porous stone, comprising contacting porous stone with a composition comprising:

(i) a fluorinated oligomer having a weight average molecular weight of not more than 70,000 g/mol and comprising repeating units derived from one or more hydrocarbon monomers and one or more fluorinated monomers represented by the formula:

$$R_f\text{—}X_t\text{-}E^1$$

wherein $R_f$ represents a perfluorinated aliphatic group having 3 or 4 carbon atoms, X represents a non-fluorinated organic linking group, t is 0 or 1 and $E^1$ represents an ethylenically unsaturated group;
and wherein the amount of repeating units derived from said fluorinated monomers is more than 50 mole % of the total amount of repeating units;

(ii) a liquid dispersing or dissolving said fluorinated oligomer, said liquid comprising an organic solvent in an amount of at least 70% by weight based on the total amount of liquid;

and wherein said fluorinated oligomer is contained in said composition in an amount of 1 to 20% by weight based on the total weight of the composition.

13 Claims, No Drawings

FLUOROCHEMICAL COMPOSITION FOR TREATING POROUS STONE

"This application claims priority from EP Application No. 04104235.9, filed Sep. 2, 2004.

The present invention relates to a method of making porous stone water and oil repellent and stain resistant. The invention relates in particular to the use therein of a fluorinated oligomer that is based on repeating units of short chain fluorinated monomers and hydrocarbon monomers.

Porous stones are frequently used decoratively in the building industry and outdoor environment. When left unprotected, porous substrates, including porous stone, quickly loose their original appearance from exposure to water-and oil-based stains and gradually deteriorate from water penetration and weathering. Common household liquids are among the most severe stains, including motor oil, cooking oil and beverages, such as coffee and wine. In order to protect porous substrates from oil-and water-based stains, they are often sealed with a film-forming resin, such as an epoxy or urethane product. These coating materials are often quite expensive and may undesirably alter the appearance of the coated substrate. Such coatings also seal the product completely, preventing or greatly reducing the escape of moisture from the coated substrate.

Fluorochemical-containing treatments have been proposed to render porous substrates resistant to soil and repellent to water-and oil-based stains. For example, U.S. Pat. No. 6,689,854 discloses a water-soluble and shelf-stable aqueous fluorochemical polymeric treatment useful to treat porous substrates to render them repellent to water-and oil-based stains. The treatment comprises a water-soluble or dispersible fluorochemical polymer containing only carbon atoms in the backbone, with a plurality of each of the following groups pendant from the backbone: (a) fluoroaliphatic groups, (b) carboxyl-containing groups, (c) silyl groups and optionally (d) other non-hydrophilic groups.

EP 1 225 187 discloses a fluorochemical composition comprising a major amount of an organic solvent and 0.05% by weight to 5% by weight of fluorochemical oligomer dispersed or dissolved in said organic solvent. The compositions are taught to be useful for rendering substrates, in particular ceramics or glass, water and/or oil repellent.

U.S. Pat. No. 4,366,300 discloses a composition for protection of materials against contaminations, spots and stains. The liquid composition comprises by weight 0.1 to 1% of at least one fluorinated resin based on acrylic or methacrylic esters of fluorinated sulfonamido-alcohol, associated or not with non-fluorinated monomers, 0.4 to 10% of at least one adjuvant selected from aminoplast resins based on melamine, thermoplastic resins and waxes, and 89 to 99.5% of at least one organic solvent.

Many surface treatments coat and seal the surface of the construction materials. This often results in an aesthetically undesirable shiny and unnatural appearance. Additionally, such coating may cause a surface more slippery and prevent water drainage.

It would now be desirable to find an alternative treatment for providing porous stone, in particular terracotta, with high water repellency and/or high oil repellency. Desirably, such treatment is durable. Further desired properties include good stain resistance and/or stain release. Desirably, the treatment provides good repellency properties when applied at room temperature, dries fast and does not require curing at elevated temperatures. In particular, it would be desirable to find such treatment that can penetrate well into the porous surface of the stone and is highly effective without changing or undesirably diminishing the aesthetical appeal.

The present invention relates to a method of treating porous stone, comprising contacting porous stone with a composition comprising:

(i) a fluorinated oligomer having a weight average molecular weight of not more than 70,000 g/mol and comprising repeating units derived from one or more hydrocarbon monomers and one or more fluorinated monomers represented by the formula:

$$R_f-X_t-E^1$$

wherein $R_f$ represents a perfluorinated aliphatic group having 3 or 4 carbon atoms, X represents a non-fluorinated organic linking group, t is 0 or 1 and $E^1$ represents an ethylenically unsaturated group;

and wherein the amount of repeating units derived from said fluorinated monomers is more than 50 mole % of the total amount of repeating units;

(ii) a liquid dispersing or dissolving said fluorinated oligomer, said liquid comprising an organic solvent in an amount of at least 70% by weight based on the total amount of liquid;

and wherein said fluorinated oligomer is contained in said composition in an amount of 1 to 20% by weight based on the total weight of the composition.

It has been found that the method of the present invention may render porous stone water and/or oil repellent. The method may further provide stain repellency to the porous stone as well. The method is generally effective when applied at room temperature, generally shows good penetration. Typically, the treatment shows good durability, even without a heat treatment. The method may be particularly useful for providing terracotta tiles with desired properties including water repellency, oil repellency and stain resistance.

The fluorinated oligomers for use in the present invention comprise units derived from at least one hydrocarbon monomer and at least one fluorinated monomer and can be prepared by free-radical polymerization generally in the presence of a chain transfer agent. The fluorinated monomer can typically be represented by the formula:

$$R_f-X_t-E^1 \quad (I)$$

wherein $R_f$ represents a perfluorinated aliphatic group having 3 or 4 carbon atoms, X represents a non-fluorinated linking group, t is 0 or 1 and $E^1$ represents an ethylenically unsaturated group.

The perfluorinated aliphatic group $R_f$ is a perfluorinated, stable, inert, preferably saturated, non-polar, monovalent aliphatic radical containing 3 or 4 carbon atoms. It can be straight chain or branched chain. Especially suitable fluorinated monomers are those in which the $R_f$-group corresponds to the formula $C_4F_9$—.

The linking group X, when present, links the perfluoroaliphatic group $R_f$ to the ethylenically unsaturated group $E^1$ and is generally a non-fluorinated organic linking group. The linking group X may be a hydrocarbon group which may optionally be substituted and which generally contains from 1 to about 20 carbon atoms. When X represents a hydrocarbon group, it may optionally contain oxygen, nitrogen, or sulfur-containing groups or a combination thereof, but X should typically be free of functional groups that substantially interfere with free-radical polymerization (e.g., polymerizable olefinic double bonds, thiols, and other such functionality known to those skilled in the art). Examples of suitable linking groups X include straight chain, branched chain or cyclic alkylene, arylene or aralkylene groups, sulfonyl, sulfoxy, sulfonamido, carbonamido, carbonyloxy, urethanylene, ureylene, oxy, and combinations thereof such as sulfonamidoalkylene.

In a particular embodiment the fluorinated monomer is an ester of an α,β-ethylenically unsaturated carboxylic acid that can be represented by the general formula

wherein $R_f$ represents a perfluorinated aliphatic group having 3 or 4 carbon atoms as described above, $X^1$ is an organic divalent linking group and $R^2$ represents hydrogen or a lower alkyl group having 1 to 4 carbon atoms. $X^1$ may for example be a hydrocarbon group that optionally may be substituted and/or that may contain oxygen, nitrogen or sulphur-containing groups or a combination thereof. Generally $X^1$ is an aliphatic group, e.g. an aliphatic group having between 1 and 10 carbon atoms.

Specific examples of fluorinated monomers include:

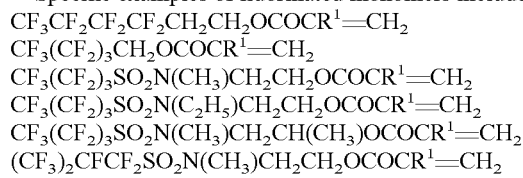

wherein $R^1$ is hydrogen or methyl.

The fluorinated monomer or mixture thereof is typically used in amounts such that the amount of the corresponding repeating units in the fluorinated oligomer is at least 50 mole %, for example at least 55 mole %. In a particular embodiment, the amount of repeating units resulting from a fluorinated monomer may be at least 60 mole %.

The hydrocarbon monomer can be represented by the general formula:

wherein $R_h$ represents hydrogen, Cl or a hydrocarbon group that may optionally contain one or more catenary or non-catenary heteroatoms and that may be contain one or more chlorine atoms and $E^2$ represents an ethylenically unsaturated group.

The hydrocarbon group $R_h$ is typically selected from the group consisting of a linear, branched or cyclic alkyl group, an aralkyl group, an alkylaryl group and an aryl group which may or may not be substituted with substituents such as e.g. oxyalkylene groups, hydroxy groups, amino groups or chlorine.

Examples of hydrocarbon monomers include esters of an α,β-ethylenically unsaturated carboxylic acid. Examples include methyl (meth)acrylate, ethyl (meth)acrylate, n-butyl (meth)acrylate, isobutyl(meth)acrylate, octadecyl(meth) acrylate, lauryl(meth)acrylate, cyclohexyl (meth)acrylate, cyclodecyl (meth)acrylate, isobornyl (meth)acrylate, phenyl (meth)acrylate, benzyl (meth)acrylate, adamantyl (meth) acrylate, tolyl (meth)acrylate, 3,3-dimethylbutyl (meth)acrylate, (2,2-dimethyl-1-methyl)propyl (meth)acrylate, cyclopentyl (meth)acrylate, 2-ethylhexyl (meth)acrylate, t-butyl (meth)acrylate, cetyl (meth)acrylate, stearyl (meth)acrylate, behenyl (meth)acrylate, isooctyl (meth)acrylate, n-octyl (meth)acrylate, 4-ethyl-cyclohexyl (meth)acrylate, 2-ethoxyethyl methacrylate, tetrahydropyranyl acrylate and vinyl and allyl (meth)acrylates. Further hydrocarbon monomers include allyl esters such as allyl acetate and allyl heptanoate; alkyl vinyl ethers or alkyl allyl ethers such as cetyl vinyl ether, dodecylvinyl ether, ethylvinyl ether; esters of unsaturated acids esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, aminoalkyl (meth)acrylates such as N,N-diethylaminoethylmethacrylate, N-t-butylaminoethylmethacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene. Further examples of non-fluorinated comonomers include chlorine containing comonomers such as vinyl chloride and vinylidene chloride.

In a particular embodiment the hydrocarbon monomers that may be copolymerised with the fluorinated monomer include those selected from isobutyl (meth)acrylate, butyl (meth)acrylate, 2-ethylhexyl (meth)acrylate, lauryl (meth) acrylate, vinylidenechloride and octadecyl(meth)acrylate.

The hydrocarbon monomers can be used in amounts such that the amount of the corresponding units in the oligomer is less than 50 mole %, generally less than 40 mole %.

The fluorinated oligomer used in the invention can typically be prepared by free radical polymerisation in a solvent or mixture of solvents, in order to obtain repeating units derived from said fluorinated monomers and said hydrocarbon monomers. Examples of suitable solvents include aliphatic and alicyclic hydrocarbons (e.g. hexane, heptane, cyclohexane, isoparaffin), aromatic solvents (e.g. benzene, toluene, xylene), ethers (e.g. diethylether, glyme, diglyme, diisopropylether), esters (e.g. ethyl acetate, butyl acetate, ethyleneglycol monobutyl ether acetate), alcohols (e.g. ethanol, isopropyl alcohol), ketones (e.g. acetone, methyl ethyl ketone, methyl isobutyl ketone), sulfoxides (e.g. dimethyl sulfoxide) and amides (e.g. N,N-dimethylformamide, N,N-dimethylacetamide). Halogenated solvents, such as fluorinated solvents, e.g. HFE-7100 or HFE-7200 (available from 3M Company) can be used as co-solvents. The reactants can be present in the solvent at any suitable concentration, e.g., from about 5 percent to about 90 percent by weight based on the total weight of the reaction mixture. After polymerization, the mixture can be further diluted with an organic solvent or mixture of organic solvents to obtain the desired concentration.

The polymerisation can be a thermal or photochemical polymerisation, carried out in the presence of a free radical initiator. Useful free radical initiators are known in the art and include azo compounds, such as azobisisobutyronitrile (AIBN), 2,2'-azo bis(2-methyl-butyronitrile) (V-59), azobisvaleronitrile and azobis(2-cyanovaleric acid), 2,2'-azobis(2-amidinopropane)dihydrochloride and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauroyl peroxide.

In order to obtain the desired molecular weight, the polymerisation is conveniently carried out in the presence of a chain transfer agent or a chain terminator. Suitable chain transfer agents or chain terminators include mercapto compounds such as alkylmercaptans. Specific examples include butyl mercaptan, n-octyl mercaptan, 2-mercapto ethyl ether, 2-mercapto imidazole and octadecyl-3-mercaptopropionate.

Fluorinated chain transfer agents such as a fluorinated mercapto compound can be used as well. Examples of fluorinated chain transfer agent include those of the formula:

wherein $R^1_f$ is a perfluorinated aliphatic group having 3 or 4 carbon atoms, n is 1 or 2, and wherein Q is an organic linking group such as an organic linking group described for X in respect of formula (I) above.

Examples of compounds according for formula (III) include: $C_4F_9SO_2N(Me)CH_2CH_2OCOCH_2CH_2$—SH, $C_4F_9SO_2N(Me)CH_2CH_2SH$ and $C_4F_9SO_2N(Me)CH_2CH_2OCOCH_2CH(SH)$—COO—$CH_2CH_2N(Me)O_2SC_4F_9$. The amount of the chain transfer agent used should be chosen so as to obtain the desired molecular weight of the oligomer and will generally depend on the nature of the chain transfer agent and polymerization conditions used. The chain transfer agent will typically be used in an amount between 0.25 and 25 mole % based on the fluorinated and non-fluorinated monomers used. The molecular weight of the fluorinated oligomer should be low in order to allow adequate penetration of the treatment solution into the porous stone. Typically the fluorinated oligomer useful in the present invention has a weight average molecular weight of not more than 70,000 g/mol, preferably not more than 50,000 g/mol. In a particular embodiment, the molecular weight distribution (ratio of weight average molecular weight to number average molecular weight) is low, for example not more than 7, or not more than 5 or even not more than 3. Generally the molecular weight distribution may be between 1.5 and 5 although a molecular weight distribution outside this range and/or larger than 7 may be useful as well.

The amount of fluorinated oligomer useful in the treatment composition will typically be between 1 and 20%, for example between 2 and 15%, or between 3 and 10% by weight.

In one embodiment of the present invention the composition used in the method of treatment further comprises an organic compound of an element M selected from the group consisting of Si, Ti, Zr, B, Pb, Sn, Zn and Al having at least two hydrolysable groups per molecule. The term "hydrolysable group" in connection with the present invention refers to a group which either is directly capable of undergoing condensation reactions under appropriate conditions or which is capable of hydrolyzing under appropriate conditions, such as in the presence of water absorbed on and in the porous substrate. Preferably, the hydrolysable groups are directly bonded to the element M.

Notwithstanding the fact that the fluorinated oligomer generally does not contain a silyl group having one or more hydrolysable groups or groups similar to a silyl group and capable of co-reacting with the organic compound of an element M, an improved treatment may be observed in connection with embodiments of this invention.

In a particular embodiment of the present invention, the compound of said element M can be represented by the formula

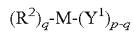

wherein $R^2$ represents a non-hydrolysable group, M represents an element selected from the group consisting of Si, Ti, Zr, B, Pb, Sn, Zn and Al, p is 2, 3 or 4 depending on the valence of M, q is 0, 1 or 2, and $Y^1$ represents a hydrolysable group. The hydrolysable groups may be the same or may be different. Preferably, the hydrolysable groups upon hydrolysis yield groups capable of undergoing condensation reactions, such as eg. silanol groups. Accordingly, the term "non-hydrolysable group" refers to a group not capable of either directly undergoing condensation reactions under appropriate conditions or of hydrolysing under the conditions listed above for hydrolysing hydrolysable groups. Examples of hydrolysable groups include halogens, such as chlorine, bromine, iodine or fluorine, alkoxy groups —OR' (wherein R' represents an alkyl group, preferably containing 1 to 8 carbon atoms and which may optionally be substituted by one or more halogen atoms), acyloxy groups —O(CO)—R" (wherein R" represents a lower alkyl group, preferably containing 1 to 6, more preferably 1 to 4 carbon atoms and which may optionally be substituted by one or more halogen atoms), aryloxy groups —OR'" (wherein R'" represents an aryl moiety, preferably containing 6 to 12, more preferably containing 6 to 10 carbon atoms, which may be optionally substituted by one or more substituents independently selected from halogens, and $C_1$-$C_4$ alkyl groups which may optionally be substituted by one or more halogen atoms). In the above formulae R', R", and R'" may include linear, branched and/or cyclic structures.

Specific examples of hydrolysable groups include $C_1$-$C_8$ alkoxy groups, such as methoxy, ethoxy, propoxy and isooctanolate groups; chlorine and acetoxy groups. Particularly preferred hydrolysable groups include $C_1$-$C_8$ alkoxy groups, such as methoxy, ethoxy, and isooctanolate groups.

The non-hydrolysable groups $R^2$ may be the same or different and are generally not capable of hydrolyzing under the conditions listed above. For example, the non-hydrolysable groups $R^2$ may be independently selected from a hydrocarbon group, for example a $C_1$-$C_{30}$ alkyl group, which may be straight chain or branched and may include one or more aliphatic, cyclic hydrocarbon structures, a $C_6$-$C_{30}$ aryl group (optionally substituted by one or more substituents selected from halogens and $C_1$-$C_4$ alkyl groups), or a $C_7$-$C_{30}$ aralkyl group.

In one embodiment the non-hydrolysable groups $R^2$ are independently selected from a hydrocarbon group, for example a $C_1$-$C_{30}$ alkyl group and a $C_6$-$C_{20}$ aryl group (optionally substituted by one or more substituents selected from halogens and $C_1$-$C_4$ alkyl groups).

Preferred compounds of element M include those in which M is Ti, Zr and Si. Representative examples of compounds of element M include tetramethoxysilane, tetra ethoxysilane, methyl triethoxysilane, dimethyldiethoxysilane, octadecyltriethoxysilane, methyl trichlorosilane, tetra-methyl orthotitanate, tetra ethyl orthotitanate, tetra-iso-propyl orthotitanate, tetra-n-propyl orthotitanate, tetra-isooctyl orthotitanate, tetraethyl zirconate, tetra-iso-propyl zirconate, tetra-n-propyl zirconate and the like. More preferred compounds include $C_1$-$C_8$ alkoxy derivatives of Si, Ti and Zr. Particularly preferred compounds of element M include dimethyldiethoxysilane, tetra-isooctyl orthotitanate and tetraethoxysilane. Single compounds or mixtures of compounds of element M may be used. Typically the compound of element M will be used in amounts between 0 and 500 parts by weight, more preferably between 5 and 200 parts by weight and most preferably between 10 and 100 parts by weight based on the weight of the fluorinated oligomer.

The fluorochemical composition may contain further additives, such as UV-light stabilisers, penetrants, viscosifiers, fillers, colorants and dyes.

The treatment composition useful in the present invention comprises liquid. The liquid comprises at least 70% by weight of an organic solvent based on the total amount of liquid. In a particular embodiment, the amount of organic solvent in the liquid is at least 75% by weight or in another embodiment at least 80% by weight. Thus the fluorinated oligomer solution as obtained after the polymerization in a solvent as described above and the optional compound of element M may be diluted with an organic solvent to obtain the desired amounts of organic solvent and fluorinated oligomer in the composition. Suitable organic solvents or mixtures of solvents include solvents useful for the polymerization of the fluorinated monomers and hydrocarbon monomers as given above. The solvent or mixture of solvents should typically be chosen so as to obtain a fast drying treatment composition that has good penetration into the porous stone. Typically the organic solvent (or mixture) should have a boiling point of between 50° C. and 200° C. Solvents that are typically used include esters, such as ethylacetate, butylacetate or ethyleneglycol monobutyl ether acetate, ketones, such as acetone and methylethylketon, alcohols, such as isopropylalcohol and ethanol, ethers, such as propyleneglycol and dipropyleneglycolmonomethylether, methoxy2-propanol and hydrocarbon solvents, such as heptane or isoparaffin or mixtures thereof.

The method of the present invention can be used to treat porous stone. Examples of porous stone include natural and man-made substrates such as for example marble, granite, terracotta, sandstone, concrete, limestone, porcelanico tiles and the like. The method of the invention is contemplated as being particularly useful for imparting repellency properties to terracotta tiles, since these have very high water and oil absorption and may therefore be more susceptible to staining.

The composition comprising the fluorinated oligomer, the organic solvent and optional additives is chosen so as to obtain a treatment composition that can penetrate well into the porous stone. Preferably the treatment solution will penetrate at least 1 mm, more preferably at least 5 mm into the porous stone. The composition can be applied to the porous stone by brushing, spraying, dipping, immersing and the like. In one particular embodiment the composition is applied using spraying. The method of the present invention can be applied to the porous stone at ambient temperature (typically, about 20° C. to 35° C.). Following application, the treated porous stone can be dried at a time sufficient to evaporate the solvent and at a temperature preferably not exceeding 80° C. Typically, the treated stone is dried at ambient temperature.

The amount of treatment composition to be applied to the porous stone will generally be that amount sufficient to provide the stone with desired water and/or oil repellency and/or soil resistance. The amount should generally be selected such that contact angles with distilled water of at least 80° and a contact angle with n-hexadecane of at least 40° C., can be measured at 20° C. The treatment is generally effective such that olive oil will not stain or penetrate the porous stone within a time period of 1 hour. Treatment of porous stone generally results in rendering the stone less retentive of soil and readily cleanable. These desired properties may be maintained despite extended exposure of the porous stone to weather conditions or wearing of the porous stone during use.

EXAMPLES

The following examples further illustrate the invention without the intention however to limit the invention thereto. All parts are by weight unless indicated otherwise.

Respective data of water and oil repellency shown in the following Examples and Comparative Examples are based on the following method of measurement and evaluation criteria:

Spray Rating (SR)

The spray rating of a treated substrate is a value indicative of the dynamic repellency of the treated substrate to water that impinges on the treated substrate. The repellency was measured by Standard Test Number 22, published in the 1985 Technical Manual and Yearbook of the American Association of Textile Chemists and Colorists (AATCC), and was expressed in terms of 'spray rating' of the tested substrate. The spray rating was obtained by spraying 250 ml water on the substrate from a height of 15 cm. The wetting pattern was visually rated using a 0 to 100 scale, where 0 meant complete wetting and 100 meant no wetting at all.

Contact Angles

The treated substrates were tested for their contact angles versus water (W) and n-hexadecane (O) using an Olympus TGHM goniometer. The contact angles were measured before (initial) and directly after abrasion (abrasion), unless otherwise indicated. The values are the mean values of 4 measurements and are reported in degrees. The minimum measurable value for a contact angle was 20°. A value <20° meant that the liquid spread on the surface.

The treated substrates were abraded using an AATCC Crockmeter, Model CM1 available from Atlas Electric Company-USA, 20 cycles using sandpaper nr. 600 (available from 3M).

Abbreviations

MeFBSE(M)A: N— methyl perfluoro-butyl sulfonamidoethyl (meth)acrylate

MeFOSEA: N— methyl perfluoro-octyl sulfonamidoethyl acrylate

ODMA: octadecyl methacrylate

FC: fluorochemical

ISANE™ IP-175: Isoparaffin, available from Total Fina

EGMBA: ethyleneglycol monobutyl ether acetate

V-59: 2,2'azobis (2-methyl-butyronitrile) obtained from Wako

BuAc: butylacetate

Tyzor TiOT: titanium tetra-isooctanolate, available from Du Pont de Nemours

Eosine: red coloured antiseptic alcoholic solution, available from Wolfs, Belgium Red oil: Flaming red dye, available from Fisher Scientific Co, USA, diluted in hexadecane at 2 g/liter Isobetadine: commercially available, brown coloured antiseptic water based solution Yellow oil: Yellow Kurkuma dye dissolved in olive oil at 2% concentration Red wine: Côtes du Roussillon Village, France Coffee: 20 g/liter Nescafé powder Synthesis of Fluorinated Oligomers Comparative Fluoropolymers Fluorinated oligomer MeFBSEMA/ODMA (75/25) made with octadecyl-3-mercaptopropionate as chain transfer agent and further referred to as FC-1, was made according to the following procedure:

A 500 ml glass bottle, equipped with a condenser, a temperature control and a dry $N_2$ inlet, was charged with 75 g MeFBSEMA (0.176 moles) followed by 25 g ODMA (0.073 moles) and 4.8 g (0.014 moles) octadecyl-3-mercaptopropionate. 70.6 g EGMBA was added and the reaction mixture was degassed 3 times under vacuum with dry $N_2$. V-59 catalyst was added (2% on solids) and the reaction temperature was increased to 75° C. The reaction was run for 20 hours under dry $N_2$. After cooling to 30° C., additionally 0.25% V-59 were added and the reaction mixture was heated to 75° C. The reaction was continued for 3 to 4 hours. The reaction mixture was cooled to 25° C. and 3.54 g EGMBA and 173.05 g ISANE™ IP-175 were added. The mixture was stirred until it was homogeneous. The number and weight average molecular weight using GPC analysis were determined to be 4928 and 12209 respectively. Treatment solutions were prepared by diluting the above prepared fluorinated oligomer solution to obtain 6 g fluorinated oligomer solids in 100 g butylacetate.

Fluorinated oligomer MeFBSEMA/ODMA (70/30), prepared with 5% by weight n-octylmercaptane as chain transfer agent (5 g/100 g monomers) and further referred to as FC-2, was prepared according to the same procedure, but using butylacetate (reaction at 50% solids) as solvent. The number and weight average Mw, as determined by GPC were 3565 and 10481 respectively. Treatment solutions were prepared by diluting the above prepared fluorinated oligomer (6 g solids) in butylacetate (100 g).

Comparative fluoropolymer MeFBSEMA/ODMA (70/30), prepared without the addition of chain transfer agent, and further referred to as CFC-1, was prepared according to the same procedure in butylacetate at 50% solids. GPC analysis indicated that the number and weight average Mw of the polymer were 40272 and 93620 respectively.

Comparative fluoropolymer CFC-2 was a waterbased fluorochemical acrylate, prepared according to U.S. Pat. No. 6,037,429, example 1, but using MeFBSEA instead of MeFOSEA. The 20% concentrate was diluted to 6% solids in water. Comparative fluoropolymer CFC-3 is a waterbased fluorochemical acrylate, prepared according to WO 01/36526, example 1. A 9% solids aqueous solution was obtained. Comparative fluoropolymer CFC-4 was a water-based fluorochemical acrylate, prepared according to U.S. Pat. No. 6,120,892, example 1. The 30% concentrate was diluted to 6% solids in water.

Examples 1 to 6

In examples 1 to 6, 30×15 cm² terracotta tiles, available from Butech (Spain), having a water absorption of about 15%, were treated with the fluorochemical solutions as given in table 1, by spray application at 2 bar at 150 ml/minute for about 30 sec. Treated tiles were allowed to dry for 24 hours at room temperature. No heat treatment was applied. After drying, the treated tiles were tested for their contact angles versus water (W) and n-hexadecane (O) using an Olympus TGHM goniometer. The treated tiles were tested for their water repellency using the spray rating test. The results are given in table 1.

TABLE 1

Oil and water repellency of terracotta tiles

| Ex No | Composition (in 100 g BuAc) | Contact angles (°) | | SR |
|---|---|---|---|---|
| | | Water | n-hexadecane | |
| 1 | 6 g FC-1 | 117 | 67 | 90 |
| 2 | 4.2 g FC-1 + 1.8 g Tyzor TiOT | 125 | 70 | 90 |
| 3 | 6 g FC-2 | 120 | 65 | 90 |
| 4 | 4.2 g FC-2 + 1.8 g $(CH_3)_2Si(OC_2H_5)_2$ | 125 | 67 | 90 |
| 5 | 4.2 g FC-2 + 1.8 g Tyzor TiOT | 122 | 68 | 90 |
| 6 | 4.2 g FC-2 + 1.8 g $C_{18}H_{37}Si(OCH_3)_3$ | 120 | 70 | 90 |

Untreated tiles gave no repellency to water and n-hexadecane (contact angles<20° and SR=0).

Examples 7 to 9 and Comparative Examples C-1 to C-5

In examples 7 to 9, terracotta tiles, having a water absorption of about 10%, available from Ceramicas Calaf (Spain) were treated by spray application (at 2 bar at 150 ml/minute for about 30 sec) with fluorochemical compositions in BuAc, as given in table 2. The treated tiles were allowed to dry at room temperature during 24 hours. Comparative example C-1 was made by spraying tiles with a 6% solution of comparative fluoropolymer CFC-1 in butylacetate. Comparative example C-2 was made with a 35% solution of FC-2 in butylacetate. Comparative examples C-3 to C-5 were made using comparative fluoropolymers CFC-2 to CFC-4 respectively. The treated tiles were allowed to dry at room temperature during 24 hours. After drying, the tiles were evaluated for their oil and water repellency initially and after abrasion. The results are given in table 2. The tiles were tested for their stain repellency properties by applying different stains. The stains were left on the treated tiles for 16 hours at room temperature. The residues were cleaned off using a paper wipe and the tiles were visually inspected and rated using a scale from 1 to 5 (1 means no stain visible; 5 means severe stain). The results are summarized in table 3.

TABLE 2 oil and water repellency of treated terracotta tiles

| Ex | Medium | Composition (g solids in 100 g medium) | SR | Contact angles (°) | | | |
|---|---|---|---|---|---|---|---|
| | | | | Initial Water | Initial n-hexadecane | After abrasion water | After abrasion n-hexadecane |
| 7 | BuAc | 6 g FC-1 | 90 | 122 | 70 | 105 | 64 |
| 8 | BuAc | 4.2 g FC-1 + 1.8 g Tizor TiOT | 90+ | 130 | 72 | 112 | 70 |
| 9 | BuAc | 6 g FC-2 | 90 | 125 | 68 | 100 | 56 |
| C-1 | BuAc | 6 g CFC-1 | 90 | 112 | 61 | 67 | 32 |
| C-2 | BuAc | 35 g FC-2 | 90 | 110 | 65 | 74 | 46 |
| C-3 | water | 6 g CFC-2 | 70 | 73 | 46 | NA | NA |
| C-4 | water | 9 g CFC-3 | 70 | 82 | 35 | NA | NA |
| C-5 | water | 6 g CFC-4 | 50+ | 80 | 40 | NA | NA |

NA: not available

TABLE 3

Stain repellency of terracotta tiles treated with fluorochemical compositions

| Ex No | Composition (in 100 g BuAc) | Stain | | | | | |
|---|---|---|---|---|---|---|---|
| | | Red oil | Isobet-adine ® | Yellow oil | red wine | coffee | Eosine |
| 7 | 6 g FC-1 | 1 | 1 | 1 | 1 | 1 | 2 |
| 8 | 4.2 g FC-1 + 1.8 g Tizor TiOT | 1 | 1 | 1 | 1 | 1 | 2 |
| 9 | 6 g FC-2 | 1 | 2 | 1 | 2 | 1 | 3 |
| C-1 | 6 g CFC-1 | 2-3 | 2 | 3 | 2 | 2 | 4 |
| C-2 | 35 g FC-2 | 2 | 2 | 2 | 2 | 2 | 3 |

The invention claimed is:
1. Method of treatment comprising contacting porous stone with a composition comprising:
(i) a fluorinated oligomer having a weight average molecular weight of not more than 70,000 g/mol and comprising repeating units derived from one or more hydrocarbon monomers and one or more fluorinated monomers represented by the formula:

wherein $R_f$ represents a perfluorinated aliphatic group having 3 or 4 carbon atoms, X represents a non-fluorinated linking group, t is 0 or 1 and $E^1$ represents an ethylenically unsaturated group;

and wherein the amount of repeating units derived from said fluorinated monomers is more than 50 mole % of the total amount of repeating units;

(ii) a liquid dispersing or dissolving said fluorinated oligomer, said liquid comprising an organic solvent in an amount of at least 70% by weight based on the total amount of liquid;

wherein the fluorinated oligomer does not contain a silyl group having one or more hydrolysable groups, and wherein said fluorinated oligomer is contained in said composition in an amount of 1 to 20% by weight based on the total weight of the composition.

2. Method according to claim 1 wherein said composition further comprises an organic compound of an element M selected from the group consisting of Si, Ti, Zr, B, Pb, Sn, Zn and Al and having at least two hydrolysable groups per molecule.

3. Method according to claim 2 wherein said compound of said element M corresponds to the formula:

$$(R^2)_q\text{-}M\text{-}(Y^1)_{p\text{-}q}$$

wherein $R^2$ represents a non-hydrolysable group, M has the same meaning as defined in claim 2, $Y^1$ represents a hydrolysable group, p is 2, 3 or 4 and corresponds to the valence of M and q is 0, 1 or 2 and p-q is at least 2.

4. Method according to claim 2 wherein M is selected from Si, Ti or Zr.

5. Method according claim 2 wherein said organic compound is present in an amount of 10 to 100 parts by weight based on the weight of said fluorinated oligomer.

6. Method according to claim 1 wherein said liquid comprises organic solvent in an amount of at least 80% by weight based on the total amount of liquid.

7. Method according to claim 1 wherein said fluorinated oligomer is contained in said composition in an amount of 2 to 15% by weight based on the total weight of the composition.

8. Method according to claim 1 wherein said hydrocarbon monomers correspond to the general formula:

$$R_h\text{-}E^2$$

wherein $E^2$ represents an ethylenically unsaturated group and wherein $R_h$ represents hydrogen, Cl or a hydrocarbon group that may optionally contain one or more catenary or non-catenary heteroatoms.

9. Method according to claim 1 wherein said porous stone is selected from marble, granite, terracotta and concrete.

10. Method according to claim 1 wherein said composition is applied to said porous stone in amount sufficient to provide oil- and water repellency to said porous stone.

11. Method according to claim 1 wherein said organic solvent is selected from ketones, esters, alcohols, hydrocarbons and ethers.

12. Method according to claim 1 wherein said organic solvent has a boiling point between 50° C. and 200° C.

13. Method according to claim 1 wherein said porous stone is contacted with said composition at a temperature of not more than 80° C. and allowed to dry at a temperature of not more than 80° C.

* * * * *